United States Patent [19]
Chin et al.

[11] Patent Number: 5,144,324
[45] Date of Patent: Sep. 1, 1992

[54] ANTENNA ARRANGEMENT FOR A PORTABLE TRANSCEIVER

[75] Inventors: Melissa C. Chin, Kinnelon; James G. Evans, Colts Neck; Denis P. Orlando, Freehold, all of N.J.

[73] Assignee: AT&T Bell Laboratories, Murray Hill, N.J.

[21] Appl. No.: 388,454

[22] Filed: Aug. 2, 1989

[51] Int. Cl.⁵ ........................... H01Q 1/10; H01Q 1/24
[52] U.S. Cl. .................................... 343/702; 343/745; 343/901; 455/127
[58] Field of Search ............... 343/702, 901, 745, 749, 343/750, 752, 900, 876; 455/193, 277, 290, 121, 291, 127, 234, 129

[56] References Cited

U.S. PATENT DOCUMENTS

| | | | |
|---|---|---|---|
| 2,719,920 | 10/1955 | Ellis | 343/745 |
| 4,725,845 | 2/1988 | Phillips | 343/702 |
| 4,958,382 | 9/1990 | Imanishi | 343/702 |

FOREIGN PATENT DOCUMENTS 2242098 3/1973 Fed. Rep. of Germany ...... 343/702

*Primary Examiner*—Michael C. Wimer
*Attorney, Agent, or Firm*—Samuel R. Williamson

[57] ABSTRACT

An arrangement for increasing the level of radiated and received energy in a telescoping antenna while the antenna is in a collapsed position. The increase in energy is obtained through use of a sliding member which projects from the base of the the antenna and contacts antenna matching circuitry for making changes to this circuitry when the antenna is collapsed. Initially tuned for resonating signals for transmission and reception with the antenna in an extended position, the antenna matching circuitry is retuned by a switching action provided by the sliding member for more effective resonating of these signals with the shorter length antenna. The switching action of the sliding member also activates gain control circuitry which increases the signal levels in both an associated transmitter and receiver when the antenna is in the collapsed position.

8 Claims, 6 Drawing Sheets

ANTENNA ARRANGEMENT FOR A PORTABLE TRANSCEIVER

BACKGROUND OF THE INVENTION

1. Technical Field

This invention relates generally to transceivers and more particularly to an antenna arrangement for use in a portable transceiver such as a portable telephone.

2. Description of the Prior Art

A typical portable telephone includes an antenna, a transmitter and a receiver for communicating a radio frequency (r-f) carrier signal that is modulated by audio signals and switching signals to and from an associated base station as appropriate.

In most portable telephones, both the transmitter and the receiver are active at the same time and one antenna is shared for transmission and reception. This antenna is generally a telescoping whip antenna which is extended for use and retracted or collapsed when not in use. When the portable telephone is located at or near its maximum reception range from the base station, the antenna must be extended so that a user of the portable telephone can be assured of not missing an incoming call. Some users find the need to have the antenna extended for this condition inconvenient and therefore at time do not extend the antenna. With the antenna collapsed, however, the reception range of the portable telephone is approximately one-third of its range with the antenna extended.

Maximum operating range for a portable telephone is obtained when the telescoping antenna is fully extended and a resonating network, which matches to this antenna in the fully extended position, is provided. When the antenna is collapsed, however, the resonating network that matches the antenna in the extended position does not match the antenna in the collapsed position. The user of the portable telephone therefore loses somewhat more operating range than if he or she had used a non-extendible antenna that was properly matched by the resonating network.

Such a non-extendible antenna arrangement is disclosed in U.S. Pat. No. 4,721,962, issued to Heribert Gorzel on Jan. 26, 1988. This arrangement proposes totally enclosing both the transmit and receive antennas inside the housing of the portable telephone and thereby avoiding any antenna parts projecting therefrom. While this type of arrangement avoids the need to have an external antenna projecting from the portable telephone, it limits the maximum range for which the portable telephone is able to communicate with a base station simply because of the reduced antenna area available for radiating or receiving r-f energy.

SUMMARY OF THE INVENTION

In accordance with the invention, there is provided an arrangement for increasing the level of received and radiated r-f energy in a telescoping antenna while in a collapsed position and also obtaining increased sensitivity and the maximum permitted level of radiated r-f energy in the antenna while in an extended position. The increase in r-f energy in the antenna while in the collapsed position is obtained through use of, for example, a projectable sliding member which comes in contact with and makes electrical changes to antenna circuitry when the antenna is adjusted from the extended position to the collapsed position. Initially tuned for efficiently resonating signals for transmission and reception with the antenna in an extended position, the antenna circuitry is retuned by the switching action provided by the sliding member for more effective resonating of these signals with the shorter length antenna.

There is also provided in accordance with the invention an arrangement for increasing the gain of both an associated transmitter and a receiver in response to configuring the telescoping antenna into its collapsed position. When the antenna is collapsed, the receiver gain is increased to a level greater than that normally provided when the antenna is in the extended position. This increased gain is provided to compensate for the smaller signal levels received by the shorter length antenna. Similarly, when the antenna is collapsed, the output power of the transmitter is increased to a level greater than that provided when the antenna is in the extended position to compensate for the decrease in radiation efficiency from the shorter length antenna.

BRIEF DESCRIPTION OF THE DRAWING

This invention and its mode of operation will be more clearly understood from the following detailed description when read with the appended drawing in which.

Throughout the drawings, the same elements when shown in more than one figure are designated by the same reference numerals.

DETAILED DESCRIPTION

Figure 1:
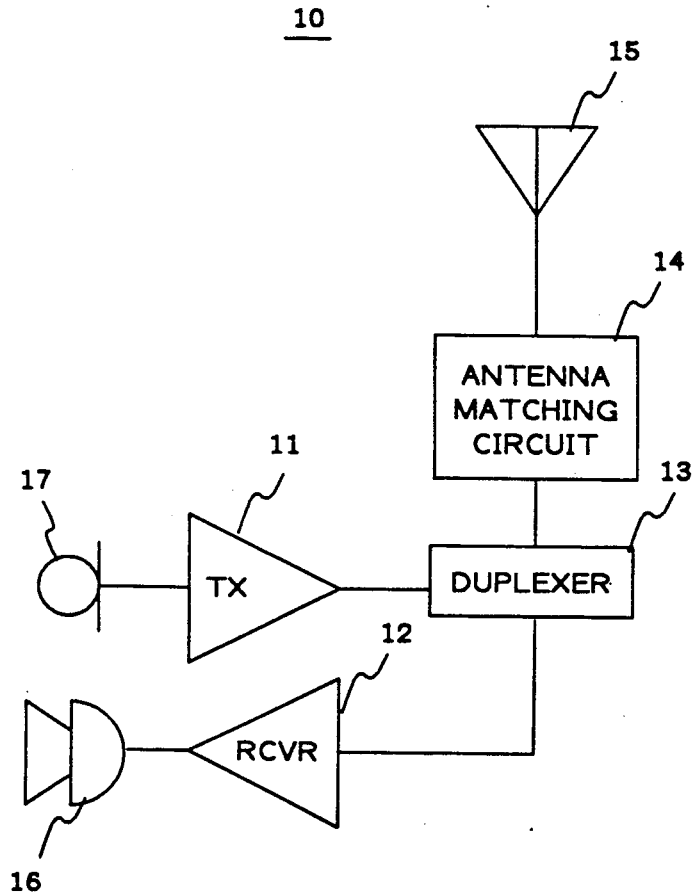
FIG. 1 is a functional block representation of a portable telephone suitable for incorporating the antenna arrangement in accordance with the principles of the invention.

FIG. 1 is a functional block representation of a portable telephone 10 suitable for incorporating the antenna arrangement and operative in accordance with the principles of the invention. As shown, the portable telephone generally comprises a transmitter 11 and a receiver 12 for respectively transmitting signals to and receiving signals from a base station (not shown) or some other associated transceiver. The transmit and receive signals are coupled via a duplexer 13 and an antenna matching circuit 14 to an antenna 15. The duplexer 13 permits the transmitter 11 and the receiver 12 to simultaneously transmit and receive signals over antenna 15 while preventing the output of transmitter 11 from being coupled directly to the input of receiver 12. The receiver 12 demodulates voice signals transmitted by the base station and couples these signals to a loudspeaker 16. The transmitter 11 receives as its input speech signals from a microphone 17 which it transmits to the base station. The antenna matching circuit 14 contains selectable reactive elements for resonating the antenna 15 to a particular r-f frequency or frequency band, the elements selected being determined by the position of the antenna, i.e., either extended or collapsed.

Figure 2:
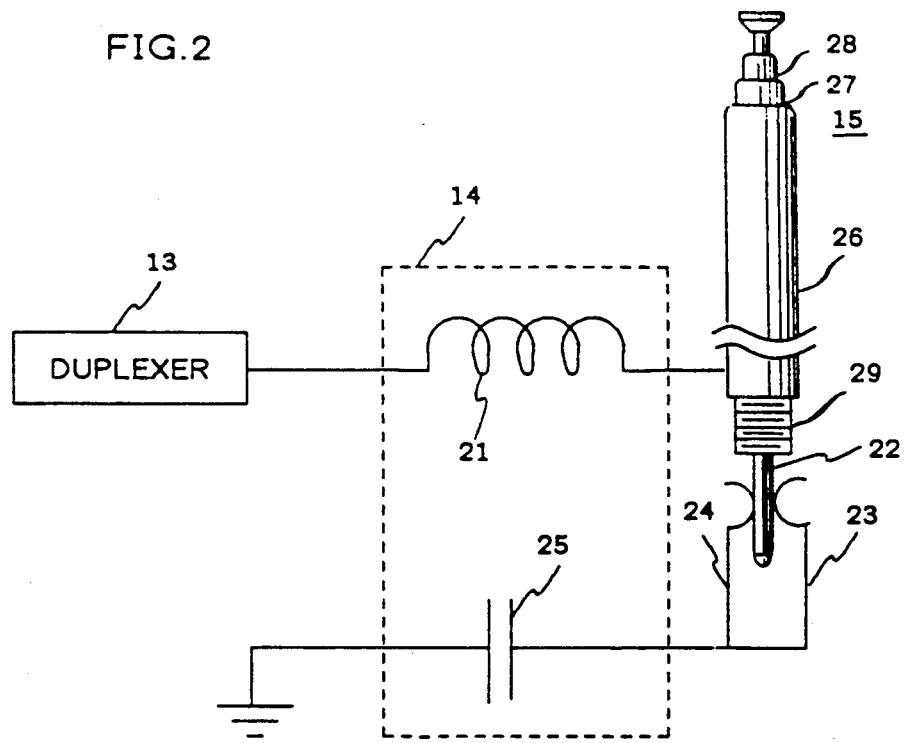
FIGS. 2, 3 and 4 show the antenna arrangement and alternate arrangements of reactive elements for use in an antenna matching circuit depicted in FIG. 1.
Figure 3:
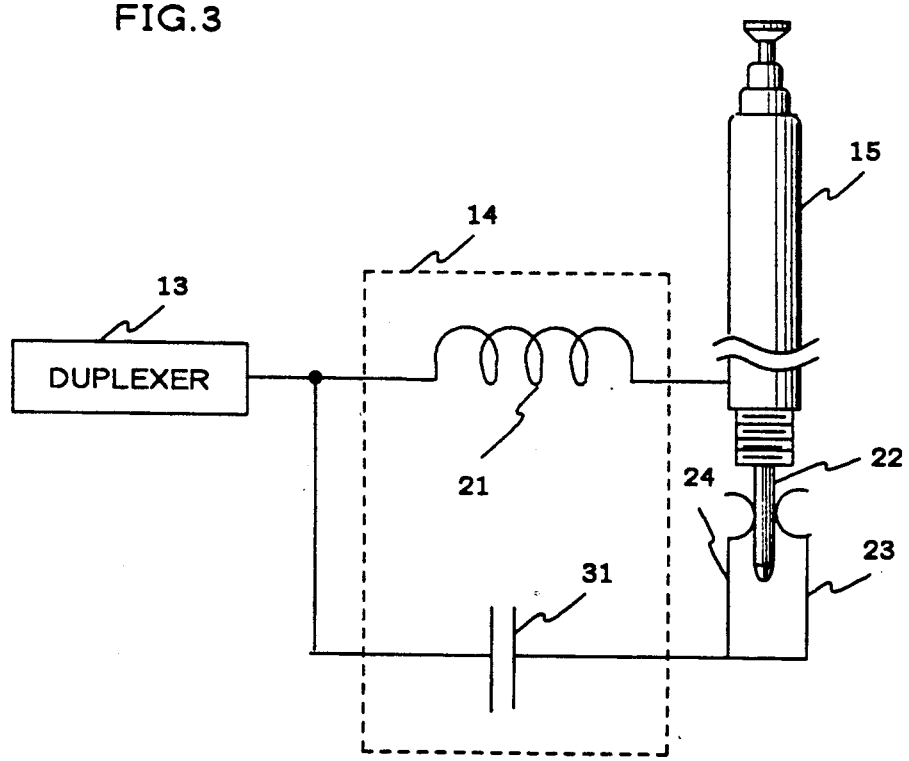
Figure 4:
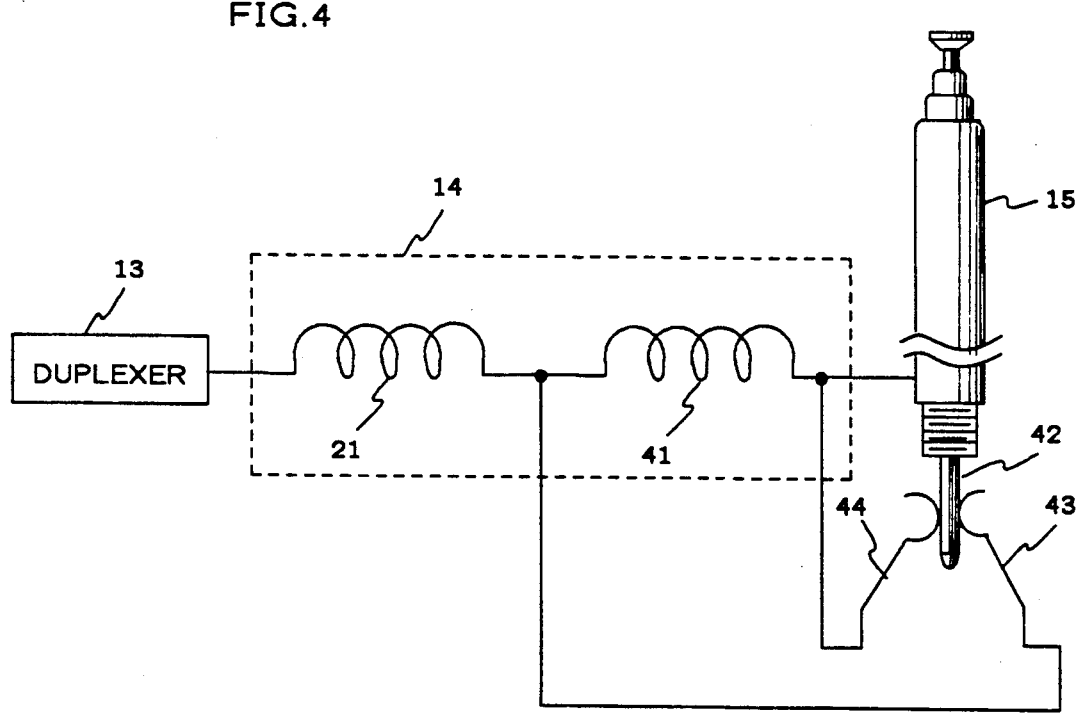

Referring next to FIG. 2 there is shown the duplexer 13, and in greater detail, the antenna 15 and an embodiment for the antenna matching circuit 14. FIGS. 2, 3 and 4 all shown alternative embodiments of the antenna matching circuit 14 arranged for resonating with the antenna 15 while in the extended and the collapsed position. A telescoping antenna, such as antenna 15 is typically three to five times its collapsed length in an extended position. Because such an antenna, in most applications and even in its extended position, is generally shorter than a quarter wavelength at its operating frequencies, its equivalent circuit contains a small capacitance in series with its radiation resistance. And this capacitance is decreased when the antenna is in the collapsed position. To deliver power efficiently to these two different load impedances, the antenna capacitance reactance is resonated at the operating frequencies by complementary reactive elements provided by antenna matching circuit 14.

With reference first to FIG. 2, antenna 15 is shown in the collapsed position and inductive element 21 in the antenna matching circuit 14 provides the electrical connection for coupling r-f signals between the duplexer 13 and the antenna 15. When the antenna is in this collapsed position, a protruding rod-shaped conducting member 22 extends outward through the base 29 of the antenna and contacts a pair of inwardly biased and opposed upstanding spring members 23 and 24 causing these spring members to make electrical contact with the antenna. Capacitive element 25 is inserted therby as a matching reactive element in the antenna matching circuit 14. When the antenna is extended, the protruding rod-shaped member 22 is removed from contact with the spring members thereby removing the capacitive element 25 from the matching circuitry provided by circuit 14 and compensating for the increased capacitance of the extended antenna. The matching element in the antenna matching circuit 14 in this configuration is then comprised only of inductive element 21 for resonating with the antenna 15.

In addition to the rod-shaped member 22, the antenna also includes cylindrical interlocking sections 26, 27 and 28. For securing this antenna assembly, the base 29 is affixed to the outer cylindrical interlocking section 26. Threads are also included on the base 29 for mounting the antenna on or in the housing of a transceiver. In the expanded position, each smaller section of the antenna extends outward from the next larger section in which it is contained until each stop surface provided by an interlock on adjacent surfaces is encountered.

Referring next to FIG. 3, there is shown an alternative arrangement for providing reactive elements for efficiently resonating with the antenna 15 while in both the collapsed and the extended position. The interaction between the rod-shaped conducting member 22 and the spring members 23 and 24 are the same as in FIG. 2 and are therefore not again described. The reactive elements employed in this arrangement are inductive element 21, which is connected to and resonates with the antenna in a fully extended position, and capacitive element 31 which, along with inductive element 21, resonates with the antenna in a collapsed position. Capacitive element 31 in this arrangement is also connected along with inductive element 21 to the output of the duplexer 13, thereby bringing the matching network back to resonance with the smaller capacitance of the collapsed antenna.

Referring next to FIG. 4 there is shown yet another alternative arrangement for providing reactive elements for efficiently resonating with the antenna 15 while in both the collapsed and the extended position. Included in this arrangement are inductive element 21, a second inductive element 41, a protruding rod-shaped non-conducting member 42 and inwardly biased and opposed upstanding spring members 43 and 44. These spring members are biased such that they normally make electrical contact with each other. The protruding rod-shaped non-conducting member 42 is extendable outward from the antenna 15 for contacting the spring members 43 and 44 thereby interrupting the electrical contact normally made between these members.

By way of operation, when the antenna 15 is in a collapsed position, signals between the duplexer 13 and the antenna 15 are coupled through inductive element 21 and inductive element 41 in the antenna matching circuit 14 for resonating with the antenna while in this position. This signal path is achieved by the rod-shaped non-conduction member 42 interrupting the continuity path normally existing between spring members 43 and 44 when it is inserted therebetween. When the antenna is in the extended position and the rod-shaped non-conducting member 42 retracted, inductive element 41 is effectively removed from the matching circuit by the alternate signal path provided around this inductive element through the spring members 43 and 44.

Figure 5:
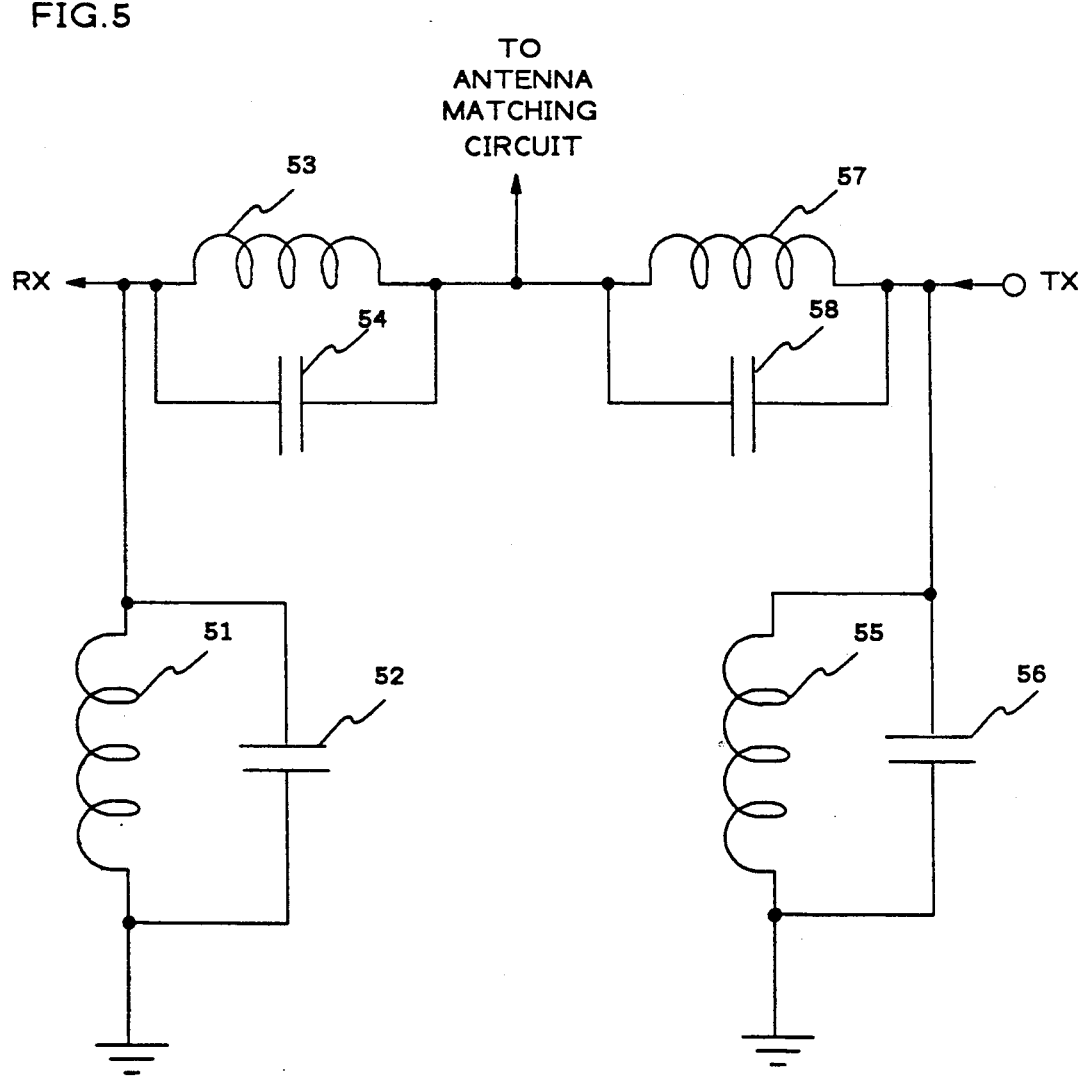
FIG. 5 shows a duplexer circuit suitable for use in this invention.

Referring next to FIG. 5, there is shown a schematic of a duplexer suitable for use as duplexer 13 in the portable telephone 10 of FIG. 1. As herein before indicated, a duplexer permits a transmitter and a receiver to respectively transmit and receive signals over a common antenna while preventing the output of the transmitter from being coupled into the input of the receiver.

The duplexer contains three ports for coupling the r-f signals, an antenna port, a receiver port (RX) for coupling the r-f signal received by the antenna to the receiver and a transmitter port (TX) for coupling the r-f signal from the transmitter to the antenna for transmission.

Separation of the transmit and receive signals are achieved by a series of filter networks employed in the transmit and receive paths of the duplexer 13. In the receive path, two filter networks are employed. A first filter network, comprising inductive element 51 and capacitive element 52, serves as a narrow pass band filter tuned to the frequency of operation of the receiver. A second filter network, comprising inductive element 53 and capacitive element 54, serves as a narrow stop band filter tuned to the frequency of operation of the transmitter.

In the transmit path, two filter networks are also employed. A first filter network in this path, comprising inductive element 55 and capacitive element 56, serves as a narrow pass band filter tuned to the frequency of operation of the transmitter. A second filter network, comprising inductive element 57 and capacitive element 58, serves as a narrow stop band filter tuned to the frequency of operation of the receiver. With this series of filter networks, the transmitter and the receiver are both able to simultaneously operate over the same antenna. The duplexer also provides a direct current (DC) path to ground for the antenna port through inductive elements 51 and 53 and also through inductive elements 55 and 57.

Figure 6:
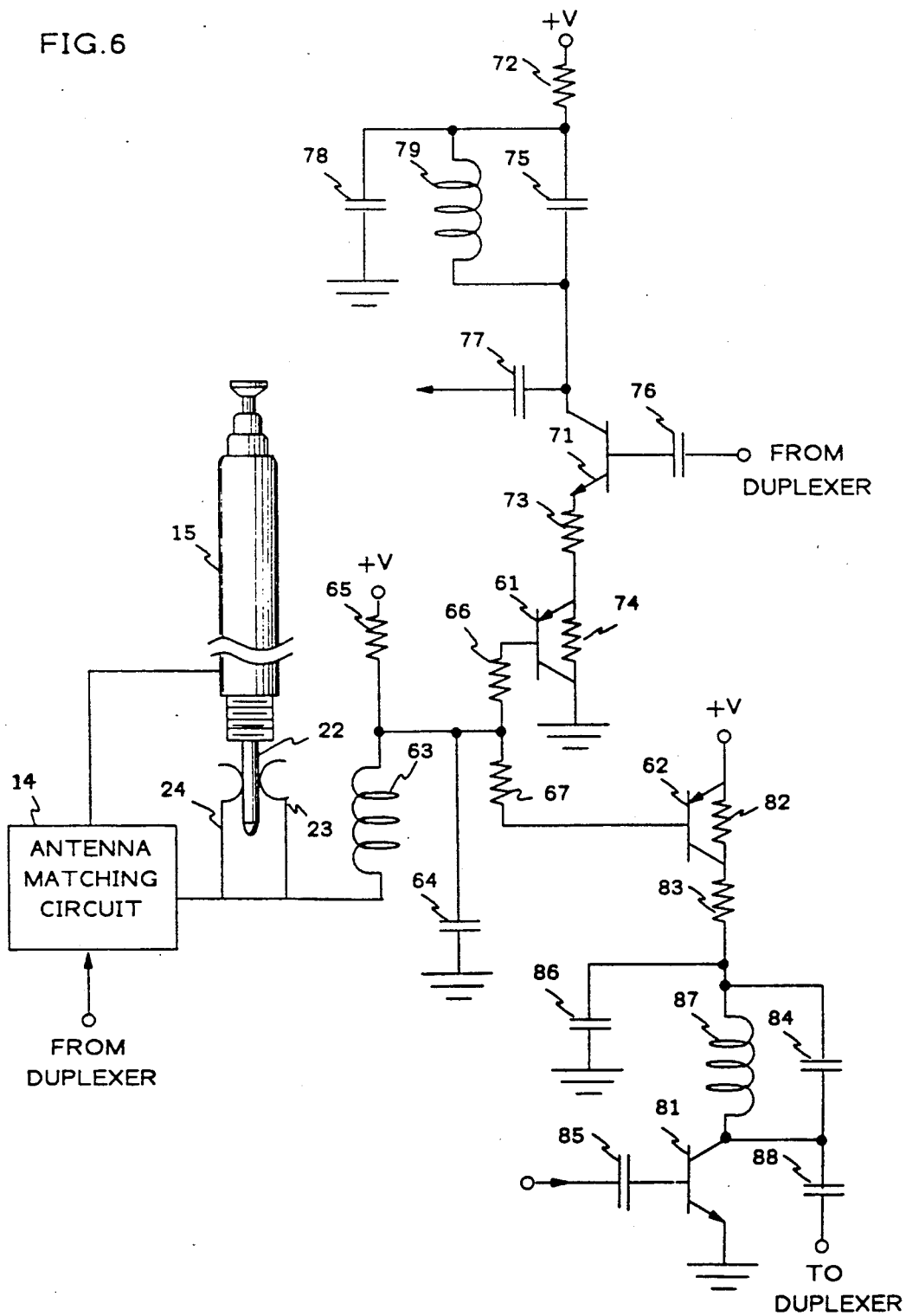
FIG. 6 shows circuitry suitable for use in a transmitter and a receiver as depicted in FIG. 1 for respectively varying the output signal level provided by each in accordance with the invention.

Referring now to FIG. 6, there is shown the antenna arrangement including circuitry for varying the gain of a transmitter and a receiver in accordance with the invention. More specifically, this circuitry comprises an active switch and both a receiver input stage and a transmitter output stage operably connected to the active switch.

By way of general operation, the active switch in this circuitry is activated by pushing the antenna down into its collapsed position. This switch, in turn, increases the receiver's r-f input stage gain to a level greater than that which is provided when the antenna is in the extended position. This advantageously simplifies designing that part of the receiver which must provide some type of balance between the sensitivity and the dynamic operating range of the receiver. Indeed, through use of this arrangement, the requirement for the dynamic operating range of the receiver may be considerably reduced. Thus when the antenna is collapsed, a greater amount of gain is automatically provided by the receiver's r-f input stage to compensate for the smaller signal levels provided by the shorter length antenna.

When the antenna is pushed down into its collapsed position, the active switch also increases the r-f output stage gain of the transmitter to a power level greater than that provided when the antenna is in the extended position. This increased power level is provided to compensate for the decrease in radiation efficiency from the shorter length antenna.

With specific reference to the circuitry of FIG. 6, the active switch comprises transistors 61 and 62 and commonly associated components, inductor 63, capacitor 64 and resistors 65, 66 and 67. Inductor 63 serves as an r-f choke for preventing r-f energy on the antenna from reaching the base of transistors 61 or 62 when the conducting member 22 is in contact with the spring members 23 and 24. Capacitor 64 serves as a bypass capacitor which further guards against undesirable signals reaching the base of these two transistors.

When the antenna is in its extended position, the protruding rod-shaped conducting member 22 is held away from the spring members 23 and 24 and pull-up resistor 65 keeps the bases of both transistor 61 and transistor 62 biased at the potential of the V+ power supply. This keeps these transistors turned off while the antenna is in this position. When the protruding rod-shaped conducting member 22 contacts the spring members 23 and 24, however, transistors 61 and 62 are both turned on by the ground potential provided via this conducting member. This ground potential is supplied to the conducting member 22 through the duplexer 13 and the antenna matching circuit 14.

The receiver input stage provides amplification for the receiver 12 and comprises a transistor amplifier 71 and associated components including resistors 72, 73 and 74, capacitors 75, 76, 77 and 78 and inductor 79. In operation, a signal from the receive port (RX) of the duplexer 13 is coupled to the transistor amplifier 71 through the coupling capacitor 76. A tuned network comprising capacitor 75 and inductor 79 resonates with the input signal from the duplexer. Capacitor 78 serves as a power supply bypass which insures that the supply side of the tuned network is at r-f ground. Operating power for the amplifier 71 is supplied through the resonance network via resistor 72. The emitter resistance which limits the current in transistor 71 is provided by resistors 73 and 74.

To provide the increase in gain, the active switch bypasses the emitter resistance provided by resistor 74 from the emitter current path of the amplifier 71. Since the gain of the amplifier 71 is proportional to the collector current, and the collector current is most nearly equal to the emitter current, activating the switch, i.e., turning on transistor 61, and effectively shorting resistor 74 thereby, increases the collector current. This causes the desired increase in gain when the antenna 15 is in the collapsed position. An output signal from the amplifier is coupled through capacitor 77 to the next stage of the receiver 12, typically a mixer stage.

A similar arrangement is used to boost the output power from the transmitter 11 when the antenna is in a collapsed position. The Federal Communications Commission (FCC) Part 15 Rules specify a maximum radiated electric field strength for portable telephones of ten thousand microvolts per meter measured at a distance of three meters from the source. When the antenna is collapsed, an increase in the transmit signal provided to the antenna is therefore permitted to compensate for the reduced signal strength caused by the decreased radiation efficiency of the shorter antenna. With this larger signal driving the shorter antenna, it is possible to return the radiated electrical field strength very near to the level permitted by the FCC.

The transmitter output stage provides power amplification to the signal from the transmitter 11 and comprises a transistor power amplifier 81 and associated components including resistors 82 and 83, capacitors 84, 85 and 86 and also inductor 87. In operation, a signal, typically from a modulator (not shown), is coupled into the power amplifier through coupling capacitor 85. Capacitor 84 and inductor 87 comprise a tuned network in the collector current path of the transistor amplifier. Capacitor 86 serves as a power supply bypass which insures that the supply side of the tuned network is at r-f ground. Resistors 82 and 83 limit the current in the collector current path.

To provide the increase in gain, the active switch transistor 62 bypasses the collector resistance provided by resistor 82. Since the gain of the amplifier 81 is proportional to the collector current, activating the switch, and effectively shorting resistor 82, increases the collector current. This causes the desired increase in gain for the amplifier when the antenna is in the collapsed position. The output signal from this transmitter output stage is coupled through capacitor 88 to the transmit port (TX) of the duplexer 13.

Various other modifications of this invention are contemplated and may obviously be resorted to by those skilled in the art without departing from the spirit and scope of the invention as hereinafter defined by the appended claims.

We claim:

1. An arrangement for increasing the level of radiated energy in a telescoping antenna while the antenna is in a collapsed position and maintaining a maximum permitted level of radiated energy while the antenna is in an extended position, the arrangement comprising:

switching means for providing an electrical activation signal when the antenna is in the extended position and in the collapsed position; and antenna tuning means responsive to the activation signal for selecting first antenna tuning circuitry for resonating with the antenna when the antenna is in the collapsed position and second antenna tuning circuitry for resonating with the antenna when the antenna is in the extended position, said first antenna tuning circuitry and said second tuning circuitry being connected to said antenna when the antenna is in said collapsed position, and said extended position, respectively; and a transmitter for providing power to the antenna, the transmitter including power boost means responsive to the electrical activation signal for increasing the level of power provided to the antenna while in the collapsed position.

2. An antenna switching arrangement for use with a telescoping antenna, the arrangement comprising:
  a telescoping antenna having a plurality of cylindrical interlocking sections including at least a first small diameter section and a second larger diameter section, the small diameter section being coaxially aligned with and disposed in the larger diameter section when the antenna is in a collapsed position and coaxially aligned and projecting outwardly from the larger diameter section in a first direction when the antenna is in an extended position;
  contact means connected to the small diameter section for extending the small diameter section for projecting outwardly from the larger diameter section in a second direction opposite that of the first direction when the antenna is in the collapsed position; and
  switch activating means activatable by the projecting of the small diameter section in the second direction when the antenna is in the collapsed position, the contact means contacting an adjacent conducting member for providing an electrical activation signal.

3. The antenna switching arrangement as in claim 2 further including circuit matching means for electrically resonating the antenna with a selected frequency signal, the matching means including a first arrangement of at least one reactive element for matching the antenna while in the extended position and a second arrangement of at least one reactive element for matching the antenna while in the collapsed position, responsive to the switch activating means, the matching means providing the first arrangement of at least one reactive element to the antenna while in the extended position and the second arrangement of at least one reactive element to the antenna while in the collapsed position.

4. An arrangement for increasing the level of radiated energy provided by a transmitter to a telescoping antenna while the antenna is in a collapsed position, the arrangement comprising:
  a telescoping antenna having a plurality of cylindrical interlocking sections including at least a first small diameter section and a second larger diameter section, the small diameter section being coaxially aligned with and disposed in the larger diameter section when the antenna is in the collapsed position and coaxially aligned and projecting outwardly from the larger diameter section in a first direction when the antenna is in an extended position;
  contct means connected to the small diameter section for extending the small diameter section for projecting outwardly from the larger diameter section in a second direction opposite that of the first direction when the antenna is in the collapsed position;
  switch activating means activatable by the projecting of the of the small diameter section in the second direction when the antenna is in the collapsed position, the contact means contacting an adjacent conducting member for providing an electrical activation signal; and
  power boost means operably connected to the transmitter for increasing power provided to the antenna by the transmitter in response to the presence of the electrical activation signal provided by the activating means.

5. An arrangement for increasing the level of received energy in a telescoping antenna while the antenna is in a collapsed position and obtaining the maximum level of received energy while the antenna is in an extended position, the arrangement comprising:
  switching means for providing an electrical activation signal when the antenna is in the extended position and in the collapsed position; and
  antenna tuning means responsive to the electrical activation signal for selecting first antenna tuning circuitry for resonating with the antenna when the antenna is in the collapsed position and second antenna tuning circuitry for resonating with the antenna when the antenna is in the extended position, said first antenna tuning circuitry and said second tuning circuitry being connected to said antenna when the antenna is in said collapsed position, and said extended position, respectively; and
  a receiver for amplifying a signal representative of the energy received by the antenna, the receiver including gain control means responsive to the electrical activation signal for increasing the gain of the receiver while the antenna is in the collapsed position.

6. An arrangement for increasing a signal level in a receiver connected to a telescoping antenna while the antenna is in a collapsed position, the arrangement comprising:
  a telescoping antenna having a plurality of cylindrical interlocking sections including at least a first small diameter section and a second larger diameter section, the small diameter section being coaxially aligned with and disposed in the larger diameter section when the antenna is in the collapsed position and coaxially aligned and projecting outwardly from the larger diameter section in a first direction when the antenna is in an extended position;
  contact means connected to the small diameter section for extending the small diameter section for projecting outwardly from the larger diameter section in a second direction opposite that of the first direction when the antenna is in the collapsed position;
  switch activating means activatable by the projecting of the small diameter section in the second direction when the antenna is in the collapsed position, the contact means contacting an adjacent conducting member for providing an electrical activation signal; and
  gain control means operably connected to the receiver for increasing the gain of the receiver in response to the presence of the electrical activation signal from the switch activating means.

7. A method of increasing the level of radiated energy in a telescoping antenna while the antenna is in a collapsed position and maintaining a maximum permitted level of radiated energy while the antenna is in an extended position, the antenna having a plurality of cylindrical interlocking sections including at least a first small diameter section and a second larger diameter section, the small diameter section being coaxially aligned with and disposed in the larger diameter section when the antenna is in the collapsed position and coaxially aligned and projecting outwardly from the larger diameter section in a first direction when the antenna is in an extended position, the method comprising the steps of:
- providing an indication when the antenna is in the extended position and the collapsed position;
- selecting first antenna tuning circuitry for reasonating with the antenna when the antenna is in the collapsed position and second antenna tuning circuitry for resonating with the antenna when the antenna is in the extended position, said first antenna tuning circuitry and said second antenna tuning circuitry being connected to said antenna when the antenna is in said collapsed position, and in said extended position, respectively;
- elongating the small diameter section for projecting outwardly from the larger diameter section in a second direction opposite that of the first direction when the antenna is in the collapsed position; and
- contacting an adjacent conducting member with the small diameter section for providing the indication that the antenna is in the collapsed position.

8. A method of increasing the level of received energy in a telescoping antenna while the antenna is in a collapsed position and obtaining the maximum level of received energy while the antenna is in an extended position, the antenna having a plurality of cylindrical interlocking sections including at least a first small diameter section and a second larger diameter section, the small diameter section being coaxially aligned with and disposed in the larger diameter section when the antenna is in the collapsed position and coaxially aligned and projecting outwardly from the larger diameter section in a first direction when the antenna is in an extended position, the method comprising the steps of:
- providing an indication when the antenna is in the extended position and in the collapsed position;
- selecting first antenna tuning circuitry for reasonating with the antenna when the antenna is in the collapsed position and second antenna tuning circuitry for resonating with the antenna when the antenna is in the extended position, said first antenna tuning circuitry and said second antenna tuning circuitry being connected to said antenna when the antenna is in said collapsed position, and in said extended position, respectively;
- elongating the small diameter section for projecting outwardly from the larger diameter section in a second direction opposite that of the first direction when the antenna is in the collapsed position; and
- contacting an adjacent conducting member with the small diameter section for providing the indication that the antenna is in the collapsed position.

* * * * *